(12) United States Patent
Kusuura

(10) Patent No.: US 8,741,415 B2
(45) Date of Patent: *Jun. 3, 2014

(54) COMPOSITE AND METHODS OF MAKING AND USING THE SAME

(71) Applicant: Empire Technology Development LLC, Wilmington, DE (US)

(72) Inventor: Takahisa Kusuura, Kanagawa (JP)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/054,195

(22) Filed: Oct. 15, 2013

(65) Prior Publication Data

US 2014/0044928 A1    Feb. 13, 2014

Related U.S. Application Data

(63) Continuation of application No. 13/518,840, filed as application No. PCT/US2011/060632 on Nov. 14, 2011, now Pat. No. 8,628,837.

(51) Int. Cl.
*B32B 3/06* (2006.01)

(52) U.S. Cl.
USPC .............................. 428/99; 428/216; 428/221

(58) Field of Classification Search
USPC ........................................... 428/99, 216, 221
See application file for complete search history.

(56) References Cited

U.S. PATENT DOCUMENTS

| | | | |
|---|---|---|---|
| 4,784,901 A | 11/1988 | Hatakeyama et al. | |
| 4,921,904 A | 5/1990 | Sparapany et al. | |
| 5,174,231 A | 12/1992 | White | |
| 5,225,506 A | 7/1993 | Ahmed et al. | |
| 5,455,294 A | 10/1995 | Sheng | |
| 5,563,218 A | 10/1996 | Rebre et al. | |
| 6,335,398 B1 | 1/2002 | Amiya et al. | |
| 2003/0207981 A1 | 11/2003 | Zhou et al. | |
| 2006/0280900 A1 | 12/2006 | Nakashita et al. | |

FOREIGN PATENT DOCUMENTS

| | | | |
|---|---|---|---|
| EP | 0 342 768 A1 | 5/1989 | |
| JP | 2000290316 A | 10/2000 | |
| JP | 2007244856 A | 9/2007 | |

OTHER PUBLICATIONS

Plascore Board™, available at http://www.plascore.com/marine-honeycomb-boat-manufacturing.php, downloaded May 12, 2011.
"Fibre-reinforced plastic," Wikipedia, downloaded Jun. 4, 2012.
"Polyamide," Wikipedia, downloaded Jun. 4, 2012.
Light Splint FC, Alcare Co., May 14, 2008.
"(SAP) polymer with high water absorbency of disposable diapers changed the history," available at http://www.chemuseum.com/professional/report/9/index.html, (2006).
"Wast Lock® Superabsorbent Polymers," available at http://www.m2polymer.com/html/superabsorbent_polyerms.html, (2011).
"Instant Snow—Erupting Snow Polymer," available at www.SteveSpanglerScience.com/experiment/insta-snow-polymer, downloaded Jun. 4, 2012.

(Continued)

*Primary Examiner* — Michael C Miggins
(74) *Attorney, Agent, or Firm* — Knobbe, Martens, Olson & Bear, LLP

(57) ABSTRACT

Disclosed herein are composites as well as methods of making these composites. The composite may, for example, be used as light-weight, high-strength structural members and wall panels. In some embodiments, the composites can be prepared from a light-weight assembly using simple procedures. Also disclosed herein are assemblies for preparing the composites.

20 Claims, 7 Drawing Sheets

(56) References Cited

OTHER PUBLICATIONS

"Production step of bonded honeycomb panel," available at http://www.sumikei-eng.co.jp/process/process.html, downloaded Jun. 4, 2012.

International Search Report and Written Opinion received in PCT/US2011/060632, mailed Feb. 2, 2012.

Wang, F. et al., "Autogenous Shrinkage of Concrete with Super-Absorbent Polymer," ACI Materials Journal, Title No. 106-M15, Technical Paper, Mar.-Apr. 2009, pp. 123-127.

Yasunori, K, "Nov. Iraqi refugees in 2005, Jordan border," "Do not go back anywhere" 700 people epitome of Middle East, Last updated on Jun. 1, 2010, accessed at http://astand.asahi.com/magazine/middleeast/interview/2010042900007.html, accessed on Sep. 30, 2013, pp. 4 (English Translation).

"Toward the rainy season [VIII] Haiti, and start building simple test of residence (shelter)," Last updated on Apr. 5, 2010, accessed at http://www.habitatjp.org/jpblog/2010/04/8-1.html, accessed on Oct. 15, 2013, pp. 2 (English Translation).

"Experiment of the water-absorbing polymer," Camelopardalis, Last updated on May 9, 2006, accessed at http://d.hatena.ne.jp/camelopardalis/20060509/p1, accessed on Sep. 30, 2013, pp. 10 (English Translation).

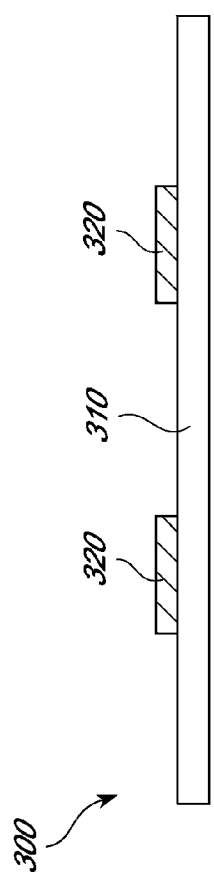
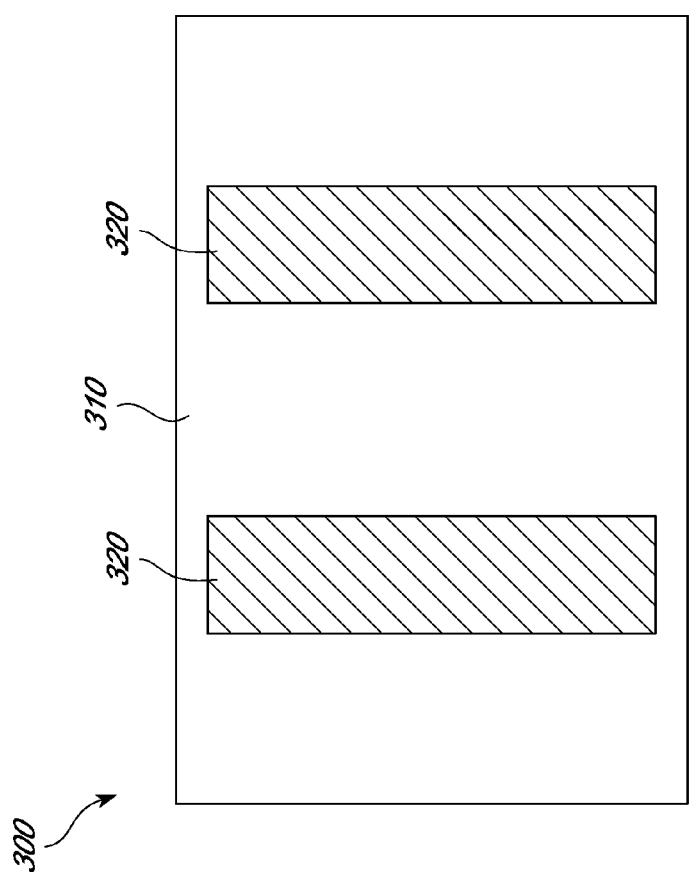

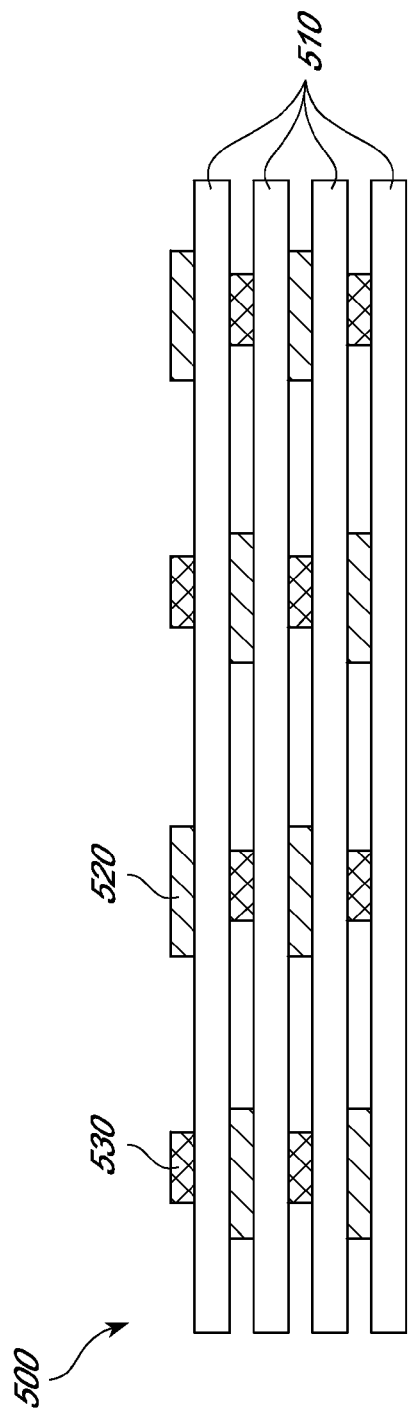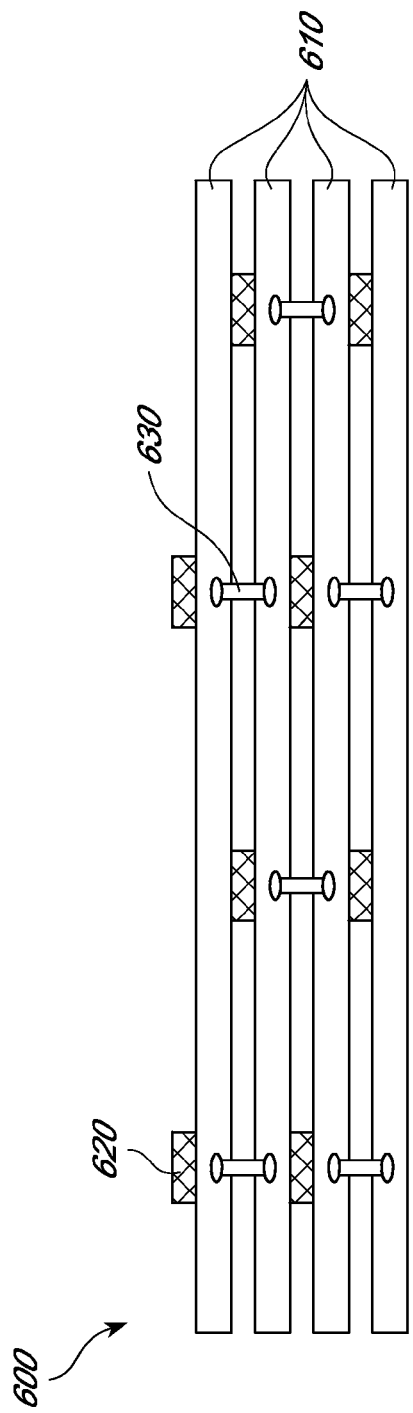
FIG. 5
FIG. 6

COMPOSITE AND METHODS OF MAKING AND USING THE SAME

CROSS-REFERENCE TO RELATED APPLICATIONS

This application is a continuation of U.S. patent application Ser. No. 13/518,840, filed on Jun. 22, 2012, which is a U.S. National Phase under 35 U.S.C. §371 of International Application No. PCT/US2011/060632, filed Nov. 14, 2011. The International Application was filed in English. The contents of the above and any and all applications for which a foreign or domestic priority claim is identified in the Application Data Sheet as filed with the present application are hereby incorporated by reference under 37 C.F.R. §1.57.

BACKGROUND

In areas of conflict or disaster, it is often necessary to provide temporary housing structures for affected individuals. Tents, mobile homes, etc. may be used to provide the necessary temporary housing. However, tents may not provide sufficient strength or safety for longer-term use. Meanwhile, mobile homes often require significant storage space, which may not be near the regions of conflict or disaster; therefore it may take an extended amount of time to transport the mobile homes to the affected regions.

SUMMARY

Some embodiments disclosed herein include a method of making a composite. The method can include providing a plurality of layers, applying water to the plurality of layers; and curing a resin in the layers to form the composite. In some embodiments, each layer includes a fabric sheet, the resin fixed to the fabric sheet, and a water-expandable polymer disposed along portions of each layer. In some embodiments, each layer is fixed to an adjacent layer at regions disposed between the portions of each layer having the water-expandable polymer.

In some embodiments, the method includes drying the plurality of layers.

In some embodiments, the method includes applying an ionic solution to the plurality of layers.

In some embodiments, curing the resin comprises applying heat, radiation, or water to the resin.

In some embodiments, a volume of the water-expandable polymer after applying the water is at least about 10 times greater than a volume of the water expandable polymer before applying the water.

In some embodiments, the regions of each layer fixed to an adjacent layer include an adhesive layer disposed between the adjacent layers. In some embodiments, the regions of each layer fixed to an adjacent layer comprise one or more fasteners.

In some embodiments, each layer comprises a plurality of tubular structures. In some embodiments, the water-expandable polymer is disposed within one or more lumens of the tubular structures.

In some embodiments, the regions of each layer fixed to an adjacent layer are located at repeating intervals. In some embodiments, the repeating interval is no more than about 800 mm. In some embodiments, the repeating interval is at least about 20 mm.

In some embodiments, each layer has a thickness of no more than about 20 mm. In some embodiments, each layer has a thickness of at least about 0.5 mm.

In some embodiments, the fabric sheet includes woven fabric. In some embodiments, the fabric sheet includes non-woven fabric. In some embodiments, the fabric sheet includes fibers including a material selected from cellulose, acryls, a protein, glass, aramids, polyesters, resins, and combinations thereof. In some embodiments, the resin fixed to the fabric sheet comprises a polymer having a hydroxyl group and a polymer having an isocyanate group.

In some embodiments, each layer includes at least about 20 of the portions of the water-expandable polymer.

Some embodiments disclosed herein include a composite prepared according to any of the methods disclosed in the present application.

Some embodiments disclosed herein include a composite. The composite can include a plurality of layers. In some embodiments, each layer includes a cured resin fixed to a fabric sheet. In some embodiments, adjacent layers of the plurality of layers are fixed together at regions disposed between the adjacent layers. The composite can include a plurality of lumens disposed between the adjacent layers.

In some embodiments, the regions of the adjacent layers fixed together comprise an adhesive layer disposed between the adjacent layers. In some embodiments, the regions of the adjacent layers fixed together comprise one or more fasteners.

In some embodiments, each layer comprises a plurality of tubular structures.

In some embodiments, the regions of the adjacent layers fixed together are located at repeating intervals. In some embodiments, the repeating interval is no more than about 800 mm. In some embodiments, the repeating interval is at least about 20 mm.

In some embodiments, each layer has a thickness of no more than about 20 mm. In some embodiments, each layer has a thickness of at least about 0.5 mm.

In some embodiments, the fabric sheet includes woven fabric. In some embodiments, the fabric sheet includes non-woven fabric.

In some embodiments, the fabric sheet includes fibers including a material selected from cellulose, acryls, a protein, glass, aramids, polyesters, resins, and combinations thereof.

In some embodiments, the cured resin is cured by applying heat, radiation, or water. In some embodiments, the cured resin includes a crosslink that includes a urethane.

In some embodiments, at least a portion of the plurality of lumens is at least partially filled with a resin or concrete.

In some embodiments, the plurality of lumens contain a water-expandable resin.

In some embodiments, a number of lumens in the composite relative to a number of layers in the composite is at least about 20 to 1.

Some embodiments disclosed herein include an assembly. In some embodiments, the assembly can include a plurality of layers. In some embodiments, the assembly can include a resin fixed to a fabric sheet. In some environments, the assembly can include a water-expandable resin disposed along portions of each layer. In some embodiments, each layer is fixed to an adjacent layer at regions disposed between the portions of each layer having the water-expandable resin.

In some embodiments, the assembly is disposed in a water-impermeable packaging.

In some embodiments, the water-expandable polymer is configured to expand at least 10 times by volume when water is applied.

In some embodiments, the resin fixed to the fabric sheet is configured to be cured by applying heat, radiation, or water to the resin.

In some embodiments, each layer comprises a plurality of tubular structures. In some embodiments, the water-expandable polymer is disposed within one or more lumens of the tubular structures.

In some embodiments, the regions of each layer fixed to an adjacent layer comprise an adhesive layer disposed between the adjacent layers. In some embodiments, the regions of each layer fixed to an adjacent layer comprise one or more fasteners.

In some embodiments, the regions of each layer fixed to an adjacent layer are located at repeating intervals along each layer. In some embodiments, the repeating interval is no more than about 800 mm. In some embodiments, the repeating interval is at least about 20 mm.

In some embodiments, each layer has a thickness of no more than about 20 mm. In some embodiments, each layer has a thickness of at least about 0.5 mm.

In some embodiments, the fabric sheet includes woven fabric. In some embodiments, the fabric sheet includes non-woven fabric.

In some embodiments, the fabric sheet includes fibers including a material selected from cellulose, acryls, a protein, glass, aramids, polyesters, resins, and combinations thereof.

In some embodiments, the resin fixed to the fabric sheet comprises a polymer having a hydroxyl group and a polymer having an isocyanate group.

In some embodiments, each layer includes at least about 20 of the portions of water-expandable polymer extending along each layer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3A is a depiction of a side view of an illustrative embodiment of a sheet that can be included in an assembly.

FIG. 3B is a depiction of a top view of an illustrative embodiment of a sheet that can be included in an assembly.

FIG. 5 is a depiction of an illustrative embodiment of an assembly.

FIG. 6 is a depiction of an illustrative embodiment of an assembly.

DETAILED DESCRIPTION

Figure 1:
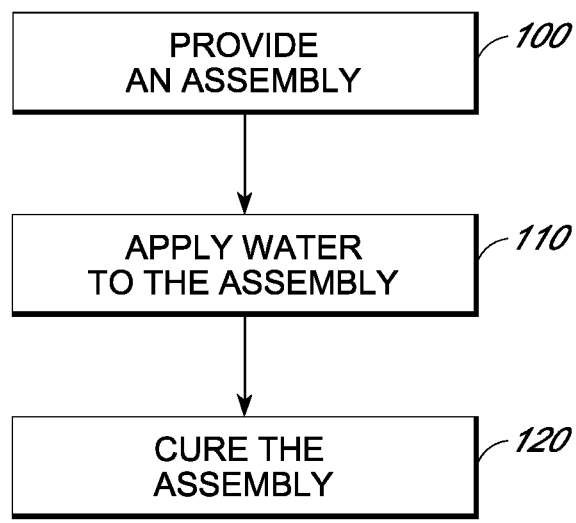
FIG. 1 is a flow diagram of an illustrative embodiment of a method of making a composite.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein are composites as well as methods of making these composites. A composite may, for example, be used as light-weight, high-strength structural members and wall panels. In some embodiments, the composites can be prepared from a light-weight assembly using simple procedures. Also disclosed herein are assemblies for preparing the composites.

FIG. 1 is a flow diagram that depicts some embodiments of a method of making a composite. The method of making the composite may include: an operation "Provide an assembly," illustrated in block 100, an operation "Apply water to the assembly," illustrated in block 110, and an operation "Cure the assembly," illustrated in block 120. Although operations 100, 110 and 120 may be performed sequentially, it will be appreciated that one or more of these operations may be performed at about the same time. These operations may also be performed in a different order than is depicted in FIG. 1.

Figure 2A:
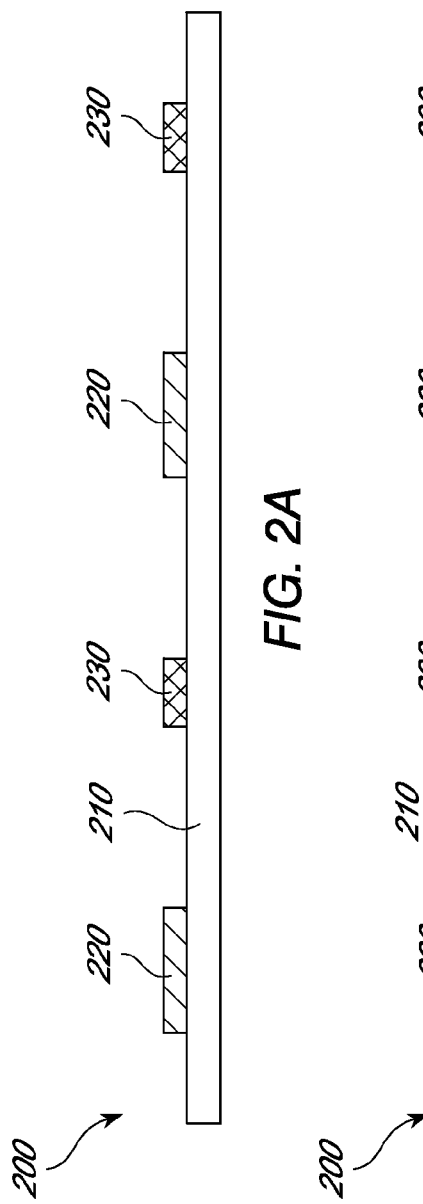
FIG. 2A is a depiction of a side view of an illustrative embodiment of a sheet that can be included in an assembly.
Figure 2B:
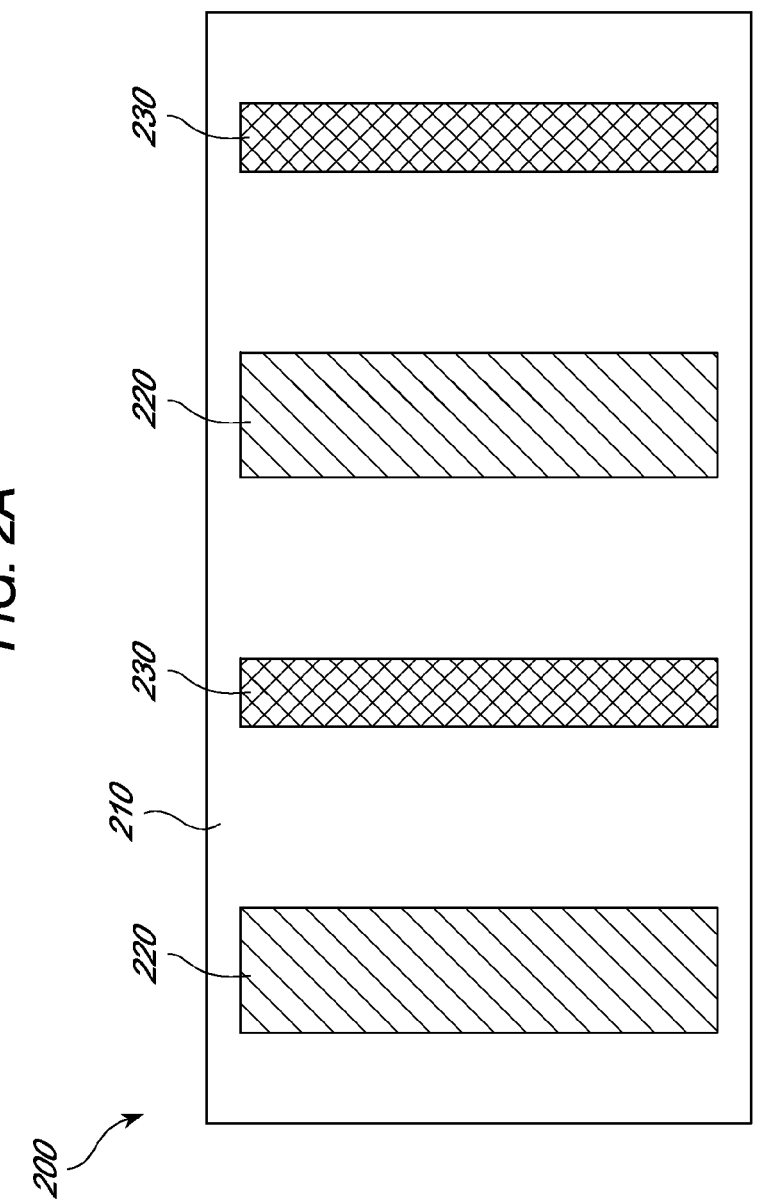
FIG. 2B is a depiction of a top view of an illustrative embodiment of a sheet that can be included in an assembly.

At operation 100 "Provide an assembly," an assembly is provided for forming the composite. In some embodiments, the assembly can include a multiple number of sheets. FIG. 2A depicts a side view of some embodiments of sheet 200 that may be included in the assembly. As depicted, sheet 200 includes a substrate 210, adhesive regions 220, and water-absorbent polymer regions 230. FIG. 2B is a top view of sheet 200.

The substrate of the sheet (e.g., substrate 210 in FIGS. 2A and 2B) may, in some embodiments, include a resin fixed to a fiber cloth. The fiber cloth is not particularly limited and generally any type of fibers may be used in the fiber cloth. The fiber cloth may include fibers having a material such as cellulose, acryls, a protein, glass, aramids, polyesters, resins, and combinations thereof. The fibers in the fiber cloth are not limited to these materials, however. The fiber cloth may, for example, be a woven or a non-woven fiber cloth.

In some embodiments, the resin fixed to the fiber cloth is a curable resin. For example, the resin may be cured by applying water, heat or radiation to the resin. Various curable resins are known in the art and are within the scope of some embodiments. Examples of resins that may be configured to be curable include, but are not limited to, acrylics, epoxies, polyesters, polyamides, polyvinyls, polyurethanes, and the like. In some embodiments, the resin includes a polymer having an isocyanate group and a hydroxyl. Without being bound to any particular theory, isocyanate groups can react with hydroxyl groups in the presence of water to crosslink the polymer. The resin may, for example, be a water-curable resin commonly used in medical casts, etc. In some embodiments, the resin is a polyurethane. Japanese Unexamined Patent Application No. 2007-244856 and U.S. Pat. No. 5,455,294 provide examples of water-curable resins that may be included in the resin. By including a curable resin, the substrate of the sheet may be flexible before curing to form a more rigid structure.

The manner in which the resin is fixed to the fiber cloth is not particularly limited. For example, the resin may be formed into a sheet that is laminated to the fiber cloth. As another example, the resin can be dip-coated or spray-coated onto the fiber cloth.

The adhesive regions of the sheet (e.g., adhesive regions 220 in FIGS. 2A and 2B) are also not particularly limited and any known adhesive can be used. The adhesive regions may, for example, include an epoxy or an acrylic. As detailed further below, the adhesive regions may fix together adjacent sheets in the assembly. Because other means for fixing the sheets together are within the scope of the present application, the adhesive regions are, however, optional.

In some embodiments, the adhesive regions are disposed along portions of the substrate. The adhesive regions may, for example, be located at repeating intervals along the substrate (e.g., as depicted in FIGS. 2A-B). The repeating interval may, for example, be at least about 20 mm; at least about 50 mm; at least about 100 mm; at least about 150 mm; or at least about 200 mm. The repeating interval may, for example, no more than about 800 mm; no more than about 600 mm; no more than about 400 mm; or no more than about 200 mm. In some embodiments, each of the adhesive regions has about the same width.

In some embodiments, the repeating interval for the adhesive regions is at least about two times the width of the adhesive regions. In some embodiments, the repeating interval for the adhesive regions is at least about three times the width of the adhesive regions. In some embodiments, the repeating interval for the adhesive regions is at least about four times the width of the adhesive regions. In some embodiments, the repeating interval for the adhesive regions is no more than about 10 times the width of the adhesive regions. In some embodiments, the repeating interval for the adhesive regions is no more than about eight times the width of the adhesive regions. In some embodiments, the repeating interval for the piece of regions is no more than about six times the width of the adhesive regions. In some embodiments, the repeating interval for the case of regions is about four times the width of the adhesive regions.

The number of adhesive regions in the sheet is not particularly limited and can vary based on various factors, such as the size and strength requirements for the final composite. The sheet may include, for example, at least about 5 adhesive regions; at least about 10 adhesive regions; at least about 20 adhesive regions; at least about 50 adhesive regions; or at least about 100 adhesive regions. The sheet may include, for example, no more than about 1000 adhesive regions; no more than about 800 adhesive regions; no more than about 500 adhesive regions; no more than about 200 adhesive regions; or no more than about 100 adhesive regions. In some embodiments the sheet can include from about five adhesive regions to about 1000 adhesive regions.

Water-absorbent polymer regions (e.g., water-absorbent polymer regions 230 in FIGS. 2A and 2B) can include any polymer that exhibits substantial volume expansion when exposed to water. In some embodiments, the water-absorbent resin is configured to expand at least about 10 times by volume when water is applied. In some embodiments, the water-absorbent resin is configured to expand at least about 15 times by volume when water is applied. In some embodiments, the water-absorbent resin is configured to expand at least about 20 times by volume when water is applied. In some embodiments, the water-absorbent polymer is configured to expand at least about 30 times by volume when water is applied. Numerous water-absorbent polymers are known in the art and are within the scope of the present application. For example, sodium polyacrylates are commonly used to absorb liquids as much as about 200 to about 300 times its mass. Other examples include, but are not limited to, water-absorbent polymers disclosed in U.S. Pat. Nos. 5,225,506, 4,921,904, 5,563,218, and 6,335,398.

In some embodiments, the water-absorbent polymer regions are disposed along portions of the substrate. The water-absorbent polymer regions may, for example, be located at repeating intervals along the substrate (e.g., as depicted in FIGS. 2A and 2B). The repeating interval may, for example, be at least about 20 mm; at least about 50 mm; at least about 100 mm; at least about 150 mm; or at least about 200 mm The repeating interval may, for example, be no more than about 800 mm; no more than about 600 mm; no more than about 400 mm; or no more than about 200 mm. In some embodiments, the water-absorbent polymer regions are interposed between the adhesive regions. In some embodiments, each of the water-absorbent polymer regions is approximately equidistant between adjacent adhesive regions. In some embodiments, the repeating interval for the water-absorbent polymer regions is about the same as the repeating interval for the adhesive regions.

The number of water-absorbent polymer regions in the sheet is not particularly limited and can vary based on various factors, such as the size and strength requirements for the final composite. The sheet may include, for example, at least about 5 water-absorbent polymer regions; at least about 10 water-absorbent polymer regions; at least about 20 water-absorbent polymer regions; at least about 50 water-absorbent polymer regions; or at least about 100 water-absorbent polymer regions. The sheet may include, for example, no more than about 1000 water-absorbent polymer regions; no more than about 800 water-absorbent polymer regions; no more than about 500 water-absorbent polymer regions; no more than about 200 water-absorbent polymer regions; or no more than about 100 water-absorbent polymer regions. In some embodiments, the sheet can include from about five water-absorbent polymer regions to about 1000 water-absorbent polymer regions. In some embodiments, the number of water-absorbent polymer regions in the sheet is about the same as the number of adhesive regions.

FIGS. 3A and 3B depict another embodiment of a sheet 300 that can be used to form the composite. As depicted, sheet 300 includes a substrate 310 and water-absorbent polymer regions 320. Substrate 310 can be generally the same as discussed above with respect to substrate 210 in FIGS. 2A and 2B. Similarly, water expandable polymer regions 320 can be generally the same as those discussed above with respect to water-absorbent polymer regions 230 in FIGS. 2A and 2B. However, as depicted in FIGS. 3A and 3B, the sheet does not include an adhesive region. In some embodiments, the sheet does not include one or more adhesive regions. As will be discussed further below, each sheet can be fixed to an adjacent sheet using one or more fasteners. In some embodiments, each sheet can be fixed to an adjacent sheet using both adhesive regions and one or more fasteners. Other means for fixing adjacent sheets together are known in the art and within the scope of the certain embodiments.

Figure 4:
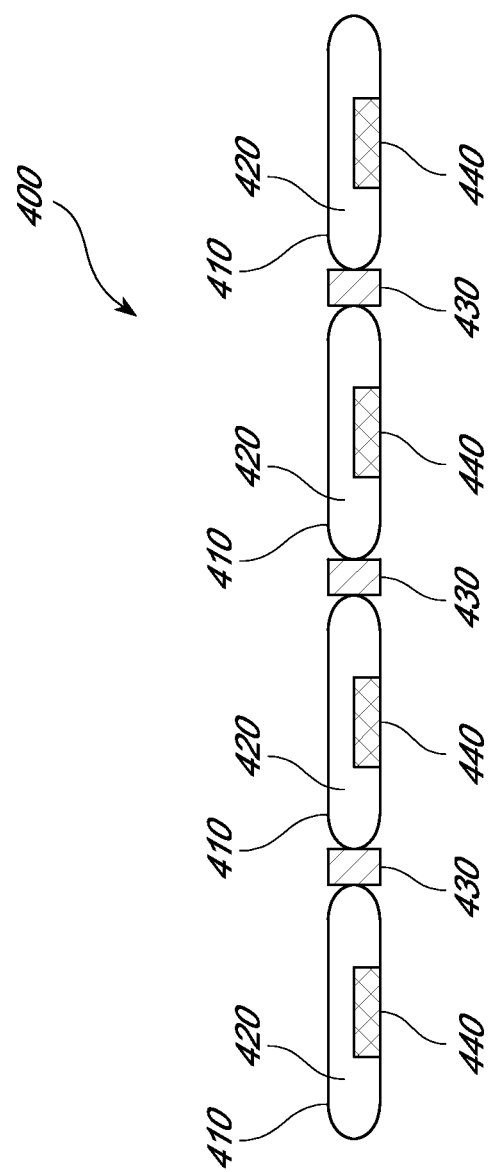
FIG. 4 is a depiction of a side view of an illustrative embodiment of a sheet that can be included in an assembly.

FIG. 4 depicts another embodiment of a sheet 400 that can be used to form the composite. As depicted, sheet 400 includes multiple tubular structures 410, lumens 420, adhesive regions 430, and water-absorbent polymer regions 440. The multiple tubular structures may, for example, be a fiber cloth wrapped around one or more times to form a generally tubular shape having lumens 420. The fiber cloth may also be fixed to a resin. Both the fiber cloth and the resin can be, for example, any of those disclosed in the present application with respect to the layers in the assembly (e.g., the same those described above with respect to substrate 210 depicted in FIG. 2 or substrate 310 depicted in FIG. 3). The multiple tubular structures 410 may be fixed together in sheet 400 by multiple adhesive regions 430. However, other means for fixing together adjacent tubular structures are known in the art and within the scope of certain embodiments. For example, the tubular structures can be fixed together by one or more fasteners (not shown). Water-absorbent polymer regions 440 may be disposed within each of the lumens 420 in the tubular structures 410. The water-absorbent polymer may, for example, be the same as those disclosed in the present application with respect to the layers in the assembly (e.g., the same as those described above with respect to adhesive regions 220 depicted in FIG. 2).

FIG. 5 depicts one example of an assembly 500 having a multiple number of sheets that can be provided in operation 100 of FIG. 1. As depicted, assembly 500 includes multiple sheets 510, each of the sheets having a multiple number of adhesive regions 520 disposed along portions of sheets 510. A multiple number of water-absorbent polymer regions 430 are also disposed along portions of sheets 510. Adhesive regions 520 can be generally same as those discussed above with respect to the sheets in the assembly (e.g. adhesive regions 220 as depicted in FIGS. 2A and 2B). Also, water-absorbent polymer regions 530 can be generally the same as those discussed above with respect to the sheets in the assembly (e.g. water-absorbent polymer regions 230 as depicted in FIGS. 2A and 2B). Sheets 510 are each fixed together by adhesive regions 520 which contacts opposing sides of two adjacent sheets. In some embodiments, the assembly is modular.

The thickness of each of the sheets in the assembly (e.g. sheets 510 as depicted in FIG. 5) is not particularly limited. The thickness of each of the sheets in the assembly can be, for example, at least about 0.5 mm; at least about 1 mm; at least about 2 mm; at least about 5 mm; or at least about 10 mm. The thickness of each of the sheets in the assembly can be, for example, no more than about 20 mm; no more than about 15 mm; no more than about 10 mm; no more than about 5 mm; or no more than about 3 mm. In some embodiments, each of the sheets in the assembly has a thickness from about 0.5 mm to about 20 mm.

The number of sheets in the assembly is also not particularly limited. The number of sheets in the assembly can be, for example, at least about 4 sheets; at least about 10 sheets; at least about 25 sheets; at least about 100 sheets; or at least about 200 sheets. The number of sheets in the assembly can be, for example, no more than about 1000 sheets; no more than about 500 sheets; no more than about 200 sheets; no more than about 100 sheets; or no more than about 50 sheets. In some embodiments, the number of sheets in the assembly is from about 4 sheets to about 1000 sheets.

FIG. 6 depicts another embodiment of an assembly 600 having a multiple number of sheets that can be provided in operation 100 of FIG. 1. As depicted, assembly 600 can include multiple sheets 610, a multiple number of water-absorbent polymer regions 620, and a multiple number of fasteners 630. Both sheets 610 and water-absorbent polymer regions 620 can be generally the same as those discussed above with respect to FIG. 5. However, assembly 600 includes a multiple number of fasteners 630 which fix adjacent sheets together in the assembly. Non-limiting examples of fasteners that may be used to fix together adjacent sheets include rivets, screws, nails, and the like. As will be appreciated by the skilled artisan, guided by the teachings in the present application, both fasteners and adhesive regions can be used in combination to fix together adjacent sheets in the assembly.

Returning to FIG. 1, operation 100 may be followed by operation 110. At operation 110 ("Apply water to the assembly"), water can be applied to the assembly. The assembly can be, for example, any of those discussed above (e.g. assembly 500 or assembly 600 as depicted in FIGS. 5 and 6, respectively). Without being bound to any particular theory, it is believed that applying water to the assembly can cause the water-absorbent polymer to absorb water and expand in volume. The expanding polymer may increase the distance between regions in the adjacent sheets in the assembly, while portions of the sheets still remain fixed together (e.g. portions fixed together by the adhesive regions and/or fasteners). In some embodiments, the expanding polymer produces lumens extending along portions of the assembly. In some embodiments, the lumens are located at repeating intervals in the assembly that corresponds to a repeating interval of the water-absorbent polymer regions in the assembly.

Figure 7:
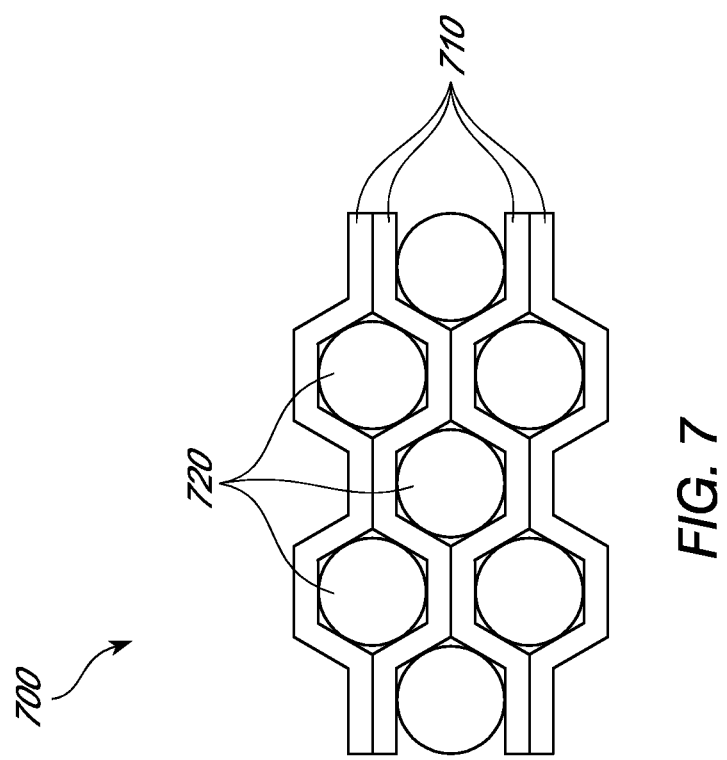
FIG. 7 is a depiction of an illustrative embodiment of an assembly after being exposed to an aqueous solution.

FIG. 7 is one example of an assembly 700 after water has been applied to the assembly. As depicted, assembly 700 includes a multiple number of sheets 710 and a multiple number of water-absorbent polymer regions 720. Polymer 720 can be expanded due to the water that is absorbed. Sheets 710 in the assembly are fixed together at various portions of sheets 710 that face each other (adhesive regions or fasteners are not shown in FIG. 7). Thus, in some embodiments, applying water to the assembly may result in a honeycomb-like structure. In some embodiments, the structure of the assembly after applying water has a regular pattern (e.g. hexagonal pattern).

Figure 8:
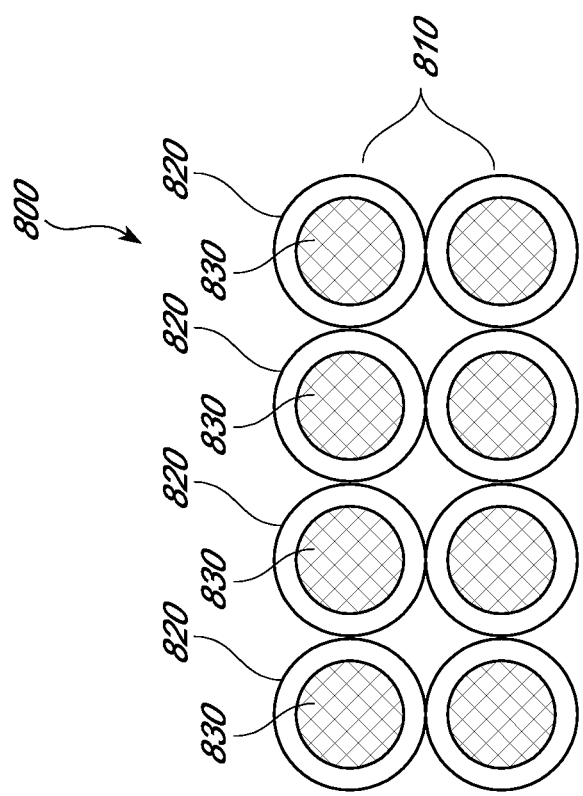
FIG. 8 is a depiction of an illustrative embodiment of an assembly after being exposed to an aqueous solution.

FIG. 8 is another example of an assembly 800 after water has been applied to the assembly. As depicted, assembly 800 includes a multiple number of sheets 810, a multiple number of tubular structures 820, and multiple number of water-absorbent polymer regions 830. The multiple number of sheets 810 may, for example, be prepared by fixing together a multiple number of sheets 400 depicted in FIG. 4. Sheets 810 in the assembly are fixed together at various portions of sheets 810 that face each other (adhesive regions or fasteners are not shown in FIG. 7). The water-absorbent polymer regions 830 may be expanded due to the water that is absorbed. Thus, in some embodiments, applying water to the assembly may also result in a square lattice. Other lattice structures are also possible and within the scope of certain embodiments, such as a parallelogrammic lattice, rectangular lattice, hexagonal lattice, or a rhombic lattice.

The thickness of the assembly may, in some embodiments, increase after applying water to the assembly. The thickness of the assembly after applying water may, for example, increase at least about 50%; at least about 100%; at least about 150%; or at least about 200%.

Returning to FIG. 1, operation 110 may be followed by operation 120. At operation 120 ("Cure the assembly"), the assembly can be cured to obtain a rigid composite. In some embodiments, the resin fixed to the fiber cloth in the sheet is cured. Various means for curing the assembly are well-known in the art, and are not particularly limited. For example, the assembly can be cured by applying heat, radiation, or water to the assembly. As will be appreciated by the skilled artisan, two or more of these curing methods may be applied either at about the same or different times to obtain a rigid composite.

The method of curing the assembly will vary depending upon the materials used in the assembly. For example, the resin in the fiber sheet may be a water-curable resin as discussed above. Thus, curing the assembly can include applying water to the assembly. When using a water-curable resin, operations 110 and 120 in FIG. 1 may occur at about the same time. However, the disclosed methods may also include a separate curing operation that occurs after applying water to the assembly. In some embodiments, the assembly can be cured by applying heat to the assembly. As an example, the assembly may include an epoxy that will cure when applying sufficient heat. In some embodiments, the assembly can be cured by applying radiation to the assembly. As an example, electron beam radiation, gamma radiation, or ultraviolet radiation can be applied to the resin in the fiber cloth to cure the resin.

After operation 120, the cured assembly may be in a rigid state to obtain the composite. For example, the composite may be configured as shown in FIG. 7A or 7B in a substantially rigid form. Thus, in some embodiments, the lumens produced by the water-absorbent polymer regions will remain even if the water-absorbent polymer regions are dried to remove the water therein.

Some of the methods disclosed herein may also include various other optional operations. As will be discussed further below, the assembly may be provided in a water-impermeable packaging. Thus, for example, the method may include removing the assembly from the water-impermeable packaging. In some embodiments, the water-impermeable packaging can be opened and water added to the packaging while the assembly remains in the packaging. The packaging may, in some embodiments, therefore serve as a container for immersing the assembly in water.

Various post-processing operations can also be included in the methods of the present application. In some embodiments, the composite can be dried. By drying the composite, for example, the water-absorbent polymer regions may decrease in volume such that the lumens produced by the water-absorbent polymer regions are generally empty. The composite can be dried by any known method. For example, the composite can be dried by applying heat or light. In some embodiments, an ionic solution (e.g. salt water) can be applied to remove water from the water-absorbent polymer regions. Without being bound to any particular theory, it is believed that adding an ionic solution inhibits the water-absorbent polymers' ability to absorb water.

In some embodiments, a reinforcing material can be added into the lumens of the composite after the water-absorbent polymer regions are dried. For example, concrete or resins can be added into these lumens to provide further structural support. All or a portion of the lumens in the composite can be filled with a reinforcing material.

The final composite can be used for building various structures that are not particularly limited. In some embodiments, two or more of the composites can be assembled into a shelter or fence. For example, one or more composite may be includes as wall panels in a structure (e.g., shelter).

Some embodiments disclosed herein include a composite. The composite may, for example, be produced by any of the methods described above (e.g. the method depicted in FIG. 1). In some embodiments, the composite can include a plurality of sheets. Each of the plurality of sheets may include a cured resin fixed to a fiber cloth. The fiber cloth can be any of those discussed above with respect to the substrate of the sheet in the assembly (e.g. substrate 210 depicted in FIG. 1).

Similarly, the cured resin can be any of the resins discussed above with respect to the substrate of the sheet in the assembly; however, the resin is in a cured state (e.g. after applying heat, radiation, or water to cure the resin) and therefore substantially rigid. In some embodiments, the cured resin includes a cross-linked structure. As an example, the cured resin may include a cross-linking group having a urethane. A urethane cross-linking group may be obtained, for example, by reacting a hydroxyl group with an isocyanate group in the presence of water.

Each of the sheets in the composite may, in some embodiments, be fixed together at regions disposed between adjacent sheets. For example, adjacent sheets may be fixed together by adhesive regions or fasteners as discussed above.

In some embodiments, adjacent sheets are fixed together at repeating intervals. The repeating intervals may be the same as those discussed above with respect to the assembly (e.g. assembly 200 depicted in FIGS. 2A and 2B). The repeating interval may, for example, be at least about 20 mm; at least about 50 mm; at least about 100 mm; at least about 150 mm; or at least about 200 mm. The repeating interval may, for example, no more than about 800 mm; no more than about 600 mm; no more than about 400 mm; or no more than about 200 mm. In some embodiments, the repeating interval is from about 20 mm to about 800 mm.

The thickness of the sheets in the composite is not limiting and may be generally the same as those discussed above with respect to the assembly used in some embodiments to form the composite. The thickness of each of the sheets in the composite can be, for example, at least about 0.5 mm; at least about 2 mm; at least about 5 mm; at least about 10 mm; or at least about 20 mm. The thickness of each of the sheets in the composite can be, for example, no more than about 60 mm; no more than about 20 mm; no more than about 15 mm; no more than about 10 mm; or no more than about 5 mm. In some embodiments, each of the sheets in the composite is about 0.5 mm to about 60 mm thick.

The number of sheets in the composite is also not limiting. The number of sheets in the composite can be, for example, at least about 4 sheets; at least about 10 sheets; at least about 25 sheets; at least about 100 sheets; or at least about 200 sheets. The number of sheets in the composite can be, for example, no more than about 1000 sheets; no more than about 500 sheets; no more than about 200 sheets; no more than about 100 sheets; or no more than about 50 sheets. In some embodiments, the number of sheets in the composite is from about 4 sheets to about 1000 sheets.

The composite may also include, in some embodiments, a plurality of lumens disposed between adjacent sheets in the composite. The lumens may, for example, be formed by water-absorbent polymer regions that were exposed to water (e.g. during operation 120 depicted in FIG. 1). Thus, in some embodiments, a water-absorbent polymer may be disposed within one or more of the lumens. The water-absorbent polymer may be expanded due to absorbed water, or may be dry.

The number of lumens in the composite may vary. The number of lumens in the composite relative to the number of sheets in the composite may, for example be at least about 20 to 1; at least about 40 to 1; at least about 50 to 1; or at least about 100 to 1. The number of lumens in the composite relative to the number of sheets in the composite may, for example, be no more than about 1000 to 1; no more than about 500 to 1; no more than about 200 to 1; no more than about 100 to 1; or no more than about 50 to 1. In some embodiments, a number of lumens in the composite relative to the number of sheets in the composite is from about 20:1 to about 1000:1.

Some embodiments disclosed herein include an assembly. The assembly may, for example, be used in a method for making a composite (e.g. the method depicted in FIG. 1). The assembly can be the same as any of those discussed above with respect to the method of making the composite. Thus, for example, FIGS. 5 and 6 depict some embodiments of the assembly.

In some embodiments, the assembly can include a plurality of sheets. Each sheet can include a resin fixed to a fiber sheet and a water-absorbent resin disposed along portions of each sheet. In some embodiments, each sheet is fixed to adjacent sheets at regions disposed between the portions of each sheet having the water-absorbent polymer.

As discussed above, the assembly may, in some embodiments, include a water-impermeable packaging to limit exposure of the assembly to water. This may prevent premature curing or expansion of the assembly. The assembly may be removed from the water-impermeable packaging before curing, or as discussed above, the packaging may also serve as a container for immersing the assembly in water by simply adding water into the packaging.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

What is claimed is:

1. A composite comprising:
   a plurality of layers, each layer comprising a cured resin fixed to a fabric sheet, wherein adjacent layers of the plurality of layers are fixed together at regions disposed between the adjacent layers; and
   a plurality of lumens disposed between the adjacent layers, wherein the regions of the adjacent layers fixed together comprise one or more fasteners.

2. The composite of claim 1, wherein the regions of the adjacent layers fixed together comprise an adhesive layer disposed between the adjacent layers.

3. The composite of claim 1, wherein each layer comprises a plurality of tubular structures.

4. The composite of claim 1, wherein the regions of the adjacent layers fixed together are located at repeating intervals, wherein the repeating interval is no more than about 800 mm.

5. The composite of claim 1, wherein the regions of the adjacent layers fixed together are located at repeating intervals, wherein the repeating interval is at least about 20 mm.

6. The composite of claim 1, wherein the fabric sheet comprises fibers including a material selected from the group consisting of cellulose, acryls, a protein, glass, aramids, polyesters, resins, and combinations thereof.

7. The composite of claim 1, wherein the cured resin comprises a crosslink that includes a urethane.

8. The composite of claim 1, wherein at least a portion of the plurality of lumens is at least partially filled with a resin or concrete.

9. A composite comprising:
   a plurality of layers, each layer comprising a cured resin fixed to a fabric sheet, wherein adjacent layers of the plurality of layers are fixed together at regions disposed between the adjacent layers; and
   a plurality of lumens disposed between the adjacent layers, wherein each layer comprises a plurality of tubular structures.

10. The composite of claim 9, wherein the regions of the adjacent layers fixed together comprise an adhesive layer disposed between the adjacent layers.

11. The composite of claim 9, wherein the regions of the adjacent layers fixed together are located at repeating intervals, wherein the repeating interval is no more than about 800 mm.

12. The composite of claim 9, wherein the regions of the adjacent layers fixed together are located at repeating intervals, wherein the repeating interval is at least about 20 mm.

13. The composite of claim 9, wherein the fabric sheet comprises fibers including a material selected from the group consisting of cellulose, acryls, a protein, glass, aramids, polyesters, resins, and combinations thereof.

14. The composite of claim 9, wherein the cured resin comprises a crosslink that includes a urethane.

15. The composite of claim 9, wherein at least a portion of the plurality of lumens is at least partially filled with a resin or concrete.

16. A composite comprising:
   a plurality of layers, each layer comprising a cured resin fixed to a fabric sheet, wherein adjacent layers of the plurality of layers are fixed together at regions disposed between the adjacent layers; and
   a plurality of lumens disposed between the adjacent layers, wherein the cured resin comprises a crosslink that includes a urethane.

17. The composite of claim 16, wherein the regions of the adjacent layers fixed together comprise an adhesive layer disposed between the adjacent layers.

18. The composite of claim 16, wherein the regions of the adjacent layers fixed together are located at repeating intervals, wherein the repeating interval is no more than about 800 mm.

19. The composite of claim 16, wherein the regions of the adjacent layers fixed together are located at repeating intervals, wherein the repeating interval is at least about 20 mm.

20. The composite of claim 16, wherein the fabric sheet comprises fibers including a material selected from the group consisting of cellulose, acryls, a protein, glass, aramids, polyesters, resins, and combinations thereof.

* * * * *

UNITED STATES PATENT AND TRADEMARK OFFICE
CERTIFICATE OF CORRECTION

| | |
|---|---|
| PATENT NO. | : 8,741,415 B2 |
| APPLICATION NO. | : 14/054195 |
| DATED | : June 3, 2014 |
| INVENTOR(S) | : Kusuura |

It is certified that error appears in the above-identified patent and that said Letters Patent is hereby corrected as shown below:

In the Specification

In Column 6, Line 6, delete "mm The" and insert -- mm. The --, therefor.

In Column 7, Line 14, delete "polymer regions 430" and insert -- polymer regions 530 --, therefor.

Signed and Sealed this
Twenty-first Day of October, 2014

Michelle K. Lee
*Deputy Director of the United States Patent and Trademark Office*